(12) United States Patent
Sugden

(10) Patent No.: US 6,527,660 B1
(45) Date of Patent: Mar. 4, 2003

(54) METHOD AND APPARATUS TO TRANSFER TORQUE AT A NOMINALLY CONSTANT SPEED TO A DYNAMOELECTRIC MACHINE FROM A VARIABLE SPEED ENGINE

(75) Inventor: Kenneth B. Sugden, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/693,004

(22) Filed: Oct. 20, 2000

(51) Int. Cl.⁷ .............................................. F16H 47/04
(52) U.S. Cl. ............................ 475/77; 60/445; 322/40
(58) Field of Search ............................. 475/72, 75, 77; 322/40; 60/425, 445

(56) References Cited

U.S. PATENT DOCUMENTS

| | | |
|---|---|---|
| 3,274,855 A | 9/1966 | Reynolds et al. |
| 3,365,981 A | 1/1968 | Gantzer |
| 3,396,607 A | 8/1968 | Ross |
| 3,786,696 A * | 1/1974 | Aleem ........................ 290/46 |
| 3,908,376 A | 9/1975 | Steiger |
| 3,968,650 A | 7/1976 | Bacquie et al. |
| 4,077,211 A | 3/1978 | Fricke |
| 4,121,501 A | 10/1978 | Finley |
| 4,141,280 A | 2/1979 | Lorimor |
| 4,191,018 A | 3/1980 | Barrett |
| 4,244,184 A * | 1/1981 | Baldauf et al. .............. 180/242 |
| 4,679,462 A | 7/1987 | Baits et al. |
| 4,774,855 A * | 10/1988 | Murrell et al. ................. 475/31 |
| 4,817,459 A | 4/1989 | Erikson et al. |
| 4,864,823 A | 9/1989 | Ikejiri et al. |
| 5,028,803 A * | 7/1991 | Reynolds ..................... 290/31 |
| 5,068,591 A * | 11/1991 | Hoegberg et al. ............. 322/29 |
| 5,072,587 A | 12/1991 | Ikejiri et al. |
| 5,092,824 A * | 3/1992 | Connett ....................... 417/212 |
| 5,125,806 A * | 6/1992 | Quick et al. ................. 417/212 |

FOREIGN PATENT DOCUMENTS

GB        1437765       6/1976

* cited by examiner

Primary Examiner—Ankur Parekh
(74) Attorney, Agent, or Firm—Wood Phillips Van Santen Clark & Mortimer

(57) ABSTRACT

A transmission for coupling a variable speed engine to a dynamoelectric machine that has three hydraulic units coupled to a mechanical summer, wherein two of the hydraulic units are varied in displacement to control the speed of the third in order to keep the speed of the dynamoelectric machine constant regardless of engine speed.

6 Claims, 6 Drawing Sheets

METHOD AND APPARATUS TO TRANSFER TORQUE AT A NOMINALLY CONSTANT SPEED TO A DYNAMOELECTRIC MACHINE FROM A VARIABLE SPEED ENGINE

FIELD OF THE INVENTION

This invention relates to transmissions, and more particularly to transmission mechanisms which are driven by a variable speed input and provide an output at a nominally constant speed.

BACKGROUND OF THE INVENTION

Constant speed drives for achieving a constant output speed for driving a load with a varying input speed are well known in the art. An important use of such a constant speed drive is in aircraft for driving a generator or alternator providing a constant frequency electrical power source for the aircraft. The constant speed drive is driven by the aircraft engine which can operate at varying speeds.

Typically, the constant speed drive has a differential with a plurality of relatively movable elements and a trim device associated therewith. This trim device is usually a hydrostatic transmission in the form of a flow-connected hydraulic pump and motor and the hydraulic pump and motor are sized proportional to the speed and load range over which the constant speed drive must operate. There are two basic configurations of the differential transmission mechanism used as a constant speed drive. There can be either an input summed differential or an output summed differential. In each instance, the trim device can add or subtract speed at the differential as required to provide a constant output speed as the input speed varies. In areas of load carrying capability and efficiency, output summed units have distinct advantages at low input speeds while input summed units are better at high input speeds.

In an output summed differential, the working pressure of the trim device is relatively constant across the speed range at any specific generator load. In connection with this, the torque of the trim device is essentially independent of speed, allowing full utilization of the torque capabilities of the trim device, but the speed capability thereof is proportional to the input speed, thereby limiting the speed utilization at the low end of the input speed range.

When an input summed differential is used, the trim device, namely, the hydraulic pump and motor, can operate from maximum speed in one direction of rotation to maximum speed in the other direction of rotation, making maximum use of the speed capabilities of the trim device, but the torque varies inversely with the input speed causing less than maximum utilization of the torque capabilities of the trim device. Additionally, when an input summed differential is operated below straight through speeds, i.e., when the input speed is below the speed where trim speed equals zero, recirculating hydraulic power can potentially cause control problems.

The foregoing characteristics tend to produce the same size trim device for use with either an input or an output summed differential, except that with the input differential, the trim device must also provide the torque to make up its own losses which increase at the low end of the input speed range. In this regard, the leakage losses at the low end of the input speed range of an input summed differential can produce a cascading effect in the recirculating hydraulic power wherein the swash plate/wobbler angle of the variable displacement hydraulic unit is increased to make up for the leakage losses, which results in an increase in the power requirement for the variable displacement hydraulic unit, which in turn results in an increased pressure, which in turn creates additional leakage losses which can then require further increases in the swash plate/wobbler angle, thereby creating a cascading effect. Because of this, the output summed differential is usually used unless some other requirement makes an input summed differential attractive.

While input and output summed constant speed drives have proven quite satisfactory for their intended purposes, there is always room for improvement.

SUMMARY OF THE INVENTION

It is a primary object of the invention to provide a new and improved method and apparatus for transmitting drive torque to a dynamoelectric machine at a nominally constant speed from a variable speed engine.

According to one aspect of the invention, a transmission is provided for use between an engine and a dynamoelectric machine to transmit drive torque from the engine to the dynamoelectric machine. The transmission includes an input shaft to transmit drive torque from an engine to a remainder of the transmission; an output shaft to transmit drive torque to a dynamoelectric machine from the transmission; a differential including an input rotary element driven by the input shaft, an output rotary element driving the output shaft, and a third rotary element rotatably coupled to the input and output elements to control the speed ratio between the input and output rotary elements; a first variable displacement hydraulic unit rotatably coupled to the output rotary element to transmit torque between the first hydraulic unit and the output rotary element; a second hydraulic unit rotatably coupled to the third rotary element to transmit torque between the second hydraulic unit and the third rotary element; and a third hydraulic unit driven by the input shaft. The first and second hydraulic units are hydraulically connected in parallel to vary the rotational speed of the second hydraulic unit as a function of the displacement of the first hydraulic unit. The third hydraulic unit is hydraulically connected in parallel to the first and second hydraulic units to transfer hydraulic power thereto.

As one feature of the invention, the third hydraulic unit is a variable displacement hydraulic unit hydraulically connected to the second hydraulic unit to vary a rotational speed of the second hydraulic unit as a function of the displacements of the first and third hydraulic units.

According to one aspect of the invention, a method is provided for transmitting drive torque to a dynamoelectric machine at a nominally constant speed from a variable speed engine. The method includes the steps of transmitting a first drive torque from a variable speed engine to an input rotary member of a differential, transmitting a second drive torque between a first hydraulic unit and an output rotary member of the differential, transmitting hydraulic power between the first hydraulic unit and a second hydraulic unit, transmitting a third drive torque between the second hydraulic unit and a third rotary member of the differential to control the speed ratio between the input and output rotary members, varying the displacement of the first hydraulic unit to vary the rotational speed of the second hydraulic unit and to obtain a nominally constant rotational speed of the output rotary member, transmitting a fourth drive torque to a dynamoelectric machine from the output rotary member, transmitting a fifth drive torque from the engine to a third hydraulic unit, and transmitting hydraulic power from the third hydraulic unit to the first and second hydraulic units.

According to one feature of the invention, the method further includes a step of varying the displacement of the third hydraulic unit as a function of the speed of the engine.

Other objects, features and advantages of the invention will become apparent from the following specification taken in connection with the accompanying drawings.

DETAILED DESCRIPTION OF THE PREFERRED EMBODIMENTS

Figure 1:
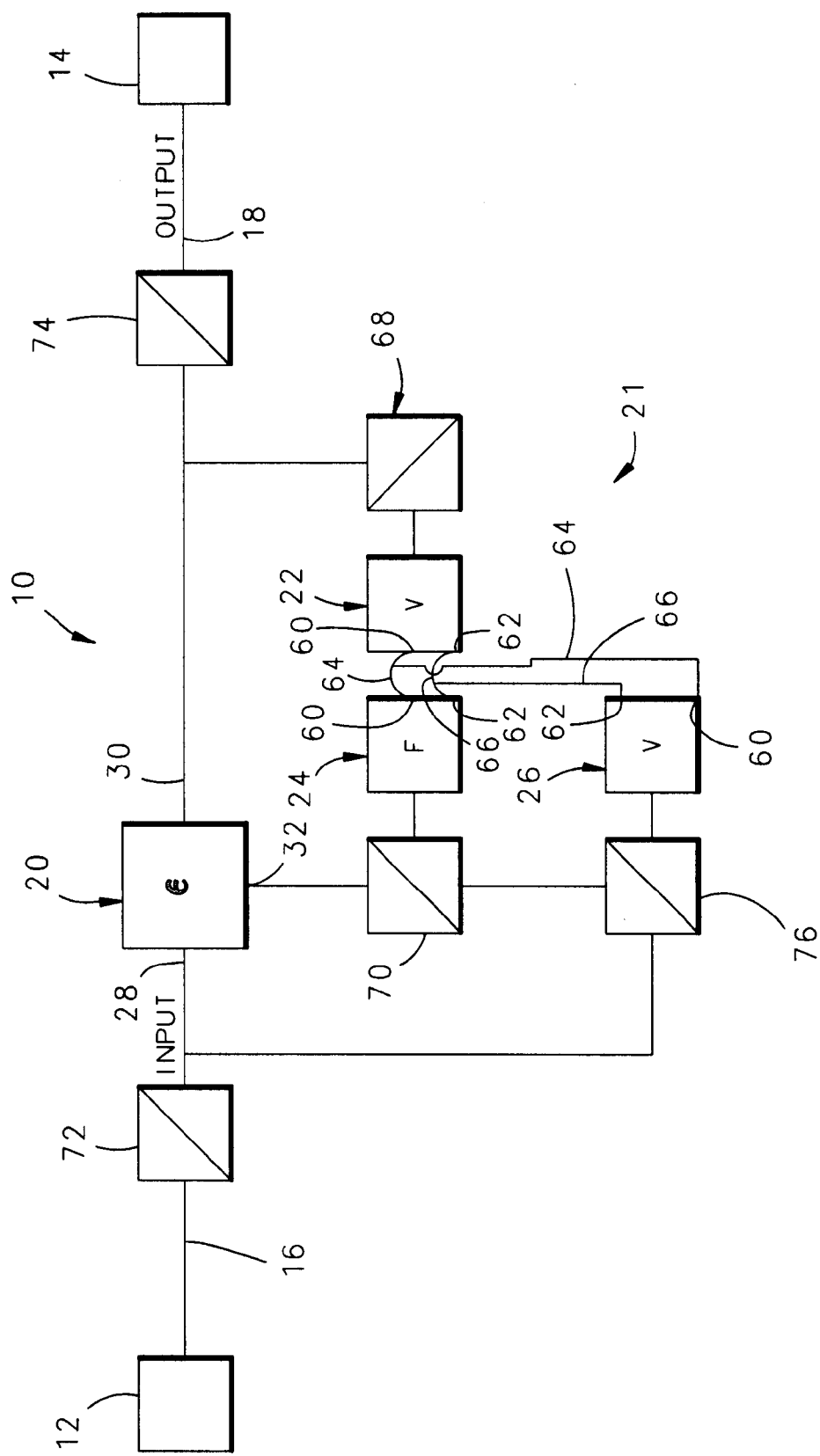
FIG. 1 is a diagrammatic representation of a transmission used to transmit drive torque from an engine to a dynamoelectric machine embodying the invention.

A transmission 10 embodying the invention is shown in FIG. 1 connected between a variable speed engine 12, such as an aircraft engine, and a dynamoelectric machine 14, such as a generator or alternator providing electric power for an aircraft. The transmission 10 includes an input shaft 16 to transmit drive torque from the engine 12 to the transmission 10, an output shaft 18 to transmit drive torque at a nominally constant rotational speed to the dynamoelectric machine 14 from the transmission 10, a mechanical summer 20 to control the speed ratio between the input and output shaft 16 and 18, and a trim device 21 including first, second, and third hydraulic units 22, 24, and 26.

The mechanical summer 20 includes an input rotary element 28 that is driven by the input shaft 16, an output rotary element 30 that drives the output shaft 18, and a third rotary element 32 that is rotatably coupled to the input and output rotary elements 28 and 30 to control the speed ratio between the input and output rotary elements 28 and 30. The first hydraulic unit 22 is a variable displacement hydraulic unit and is rotatably coupled to the output rotary element 30 to transmit torque between the first hydraulic unit 22 and the output rotary element 30. The second hydraulic unit 24 is rotatably coupled to the third rotary element 32 to transmit torque between the second hydraulic unit 24 and the third rotary element 32. The first and second hydraulic units 22, 24 are hydraulically connected in parallel to vary the rotational speed of the second hydraulic unit 24 as a function of the displacement of the first hydraulic unit 22. The third hydraulic unit 26 is driven by the input shaft 16 and is hydraulically connected in parallel to the first and second hydraulic units 22, 24 to transfer hydraulic power thereto. In this regard, it should also be understood that the rotational speed of the second hydraulic unit 24 can also be varied as a function of the displacement of the third hydraulic unit 26, or as a function of the displacement of both the first and third hydraulic units 22 and 26.

Figure 2:
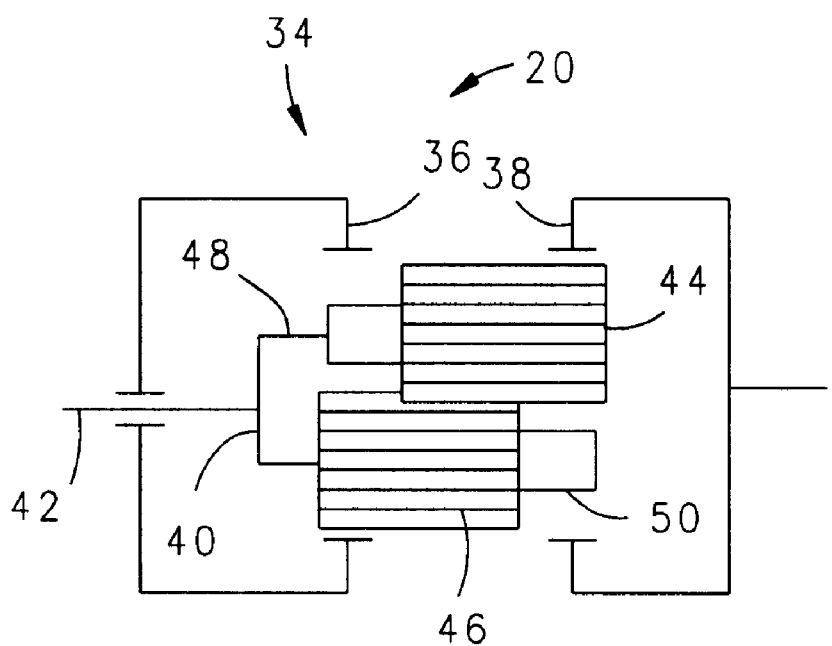
FIG. 2 is a diagrammatic illustration of a geared differential employed in the invention.

While any suitable mechanical summer 20 may be used, a geared differential 34, such as is shown diagrammatically in FIG. 2, is preferred, with one of the rotary elements 28, 30, and 32 being a first ring gear 36, another of the rotary elements 28, 30, and 32 being a second ring gear 38, and the other of the rotary elements 28, 30 and 32 being a carrier 40. The carrier 40 includes a shaft 42 and mounts two meshed planet gears 44 and 46 having opposite ends 48 and 50 of reduced diameter or with a staggard position. As a consequence of the reduced diameters or staggard position of the ends 48 and 50, the ring gear 36 engages only the planet gear 46 and the ring gear 38 engages only the planet gear 44. The use and operation of differential 34 is well known, such differentials being commonly employed in constant speed drives manufactured by the assignee of the present application. While the differential 34 is preferred, it may be desirable in some applications to employ other known configurations for mechanical summing differentials depending upon the particular requirements for the transmission 10.

The hydraulic unit 26 is preferably a variable displacement hydraulic unit. The hydraulic unit 24 is preferably a fixed displacement hydraulic unit. All of the hydraulic units 22, 24, and 26 are preferably of the well known axial piston/swash plate, fixed and variable displacement hydraulic units commonly employed by the assignee of the present application, typical forms of which are described in U.S. Pat. Nos. 3,274,855 and 3,365,981. There are many well known forms for the displacement controls of the variable displacement hydraulic units 22 and 26, the specific details of which will be highly dependent upon the specific requirements of each application of the transmission 10. Accordingly, for the sake of brevity, further description of the details of the hydraulic units 22, 24, and 26 and associated control components will not be provided herein.

Each of the first, second, and third hydraulic units 22, 24, and 26 includes a pair of hydraulic input/output ports 60 and 62, with the ports 60 being connected by one or more fluid conduits 64 and the ports 62 being connected by one or more fluid conduits 66 so that the first, second, and third hydraulic units 22, 24, and 26 are connected in parallel to transfer hydraulic fluid and power therebetween.

As seen in FIG. 1, the transmission 10 also includes gear trains 68, 70, 72, 74, and 76. The gear train 68 rotatably couples the output rotary element 30 to the hydraulic unit 22 to transfer drive torque between the output rotary member 30 and the hydraulic unit 22. The gear train 70 rotatably couples the third rotary member 32 to the hydraulic unit 24 to transmit drive torque between the third rotary member 32 and the hydraulic unit 24. The gear train 72 rotatably couples the input shaft 16 to the input rotary element 28 to transmit drive torque from the shaft 16 to the input rotor member 28. The gear train 74 rotatably couples the output rotary member 30 to the output shaft 18 to transmit drive torque from the output rotary member 30 to the output shaft 18. The gear train 76 in combination with the gear train 72 rotatably couple the input shaft 16 to the hydraulic unit 26 to transmit drive torque from the input shaft 16 to the hydraulic unit 26. While it is preferred that the gear trains 68–76 be used to rotatably couple the various components of the transmission 10 as described above for the transmission of torque therebetween and the rotational timing of the various components relative to each other, it may be desirable in some applications to utilize other types of rotatable drives in place of one or more of the gear trains 68–76, such as for example, chain and sprocket drives or belt and pulley drives. Further, it should be understood that one or more of the gear trains 68–76 can be eliminated so that the rotatable coupling between the associated components is a direct drive connection. For example, with respect to the input shaft 16 and the hydraulic unit 26, the gear trains 72 and 76 could be eliminated so that the input shaft 16 directly drives the hydraulic unit 26 through a spline or other suitable direct drive connection.

The transmission 10 preferably operates in a manner conventional to known input summed constant speed drive transmissions, with the exception that the hydraulic unit 26 provides an extra flow of hydraulic fluid and power to compensate for the inefficiencies of the hydraulic units 22 and 24, such as the inefficiencies caused by leakage between the high pressure and low pressure sides of each of the hydraulic units 22 and 24, particularly at low input speed, high input speed, output overspeed, or other block speed anomalies. For example, the hydraulic unit 26 can be set at maximum displacement at low input speeds to compensate for the inefficiencies of the hydraulic units 22 and 24 at the increased pressures associated with low input speed operation of an input summed unit. By way of further example, the swash plate of the hydraulic unit 26 can be designed to go over center to function as a hydraulic motor, rather than as a hydraulic pump, in response to an overspeed of the rotary element 32 (a condition which can occur at high input shaft 16 overspeeds and/or sudden reductions in output shaft 18 speed) to compensate for the additional hydraulic flow generated by hydraulic unit 24. Additionally, the extra hydraulic oil flow provided by the hydraulic unit 26 can be used within the operating speed range of the transmission 10 to increase the load capacity of the transmission 10 in comparison to conventional input summed constant speed drive transmission. This allows the hydraulic units 22 and 24 to be optimized to maximize their load carrying capability without regard to inefficiencies, such as leakage between the high and low pressure sides of the hydraulic units 22 and 24, at low speed, high speed or other speed anomaly conditions. In conventional input and output summed constant speed drive transmission, these factors can normally severely limit the maximum load capabilities of the transmission or negatively impact hydraulic component sizing. It is preferred that the transmission 10 be optimized on the basis that the hydraulic units 22 and 24 will be of equal block size. It is anticipated that for most applications, the hydraulic unit 26 will be smaller, and in many cases much smaller, than the hydraulic units 22 and 24. However, the relative sizing of all of the hydraulic units 22, 24, and 26 will be highly dependent upon the particular requirements of each application.

Figure 3:
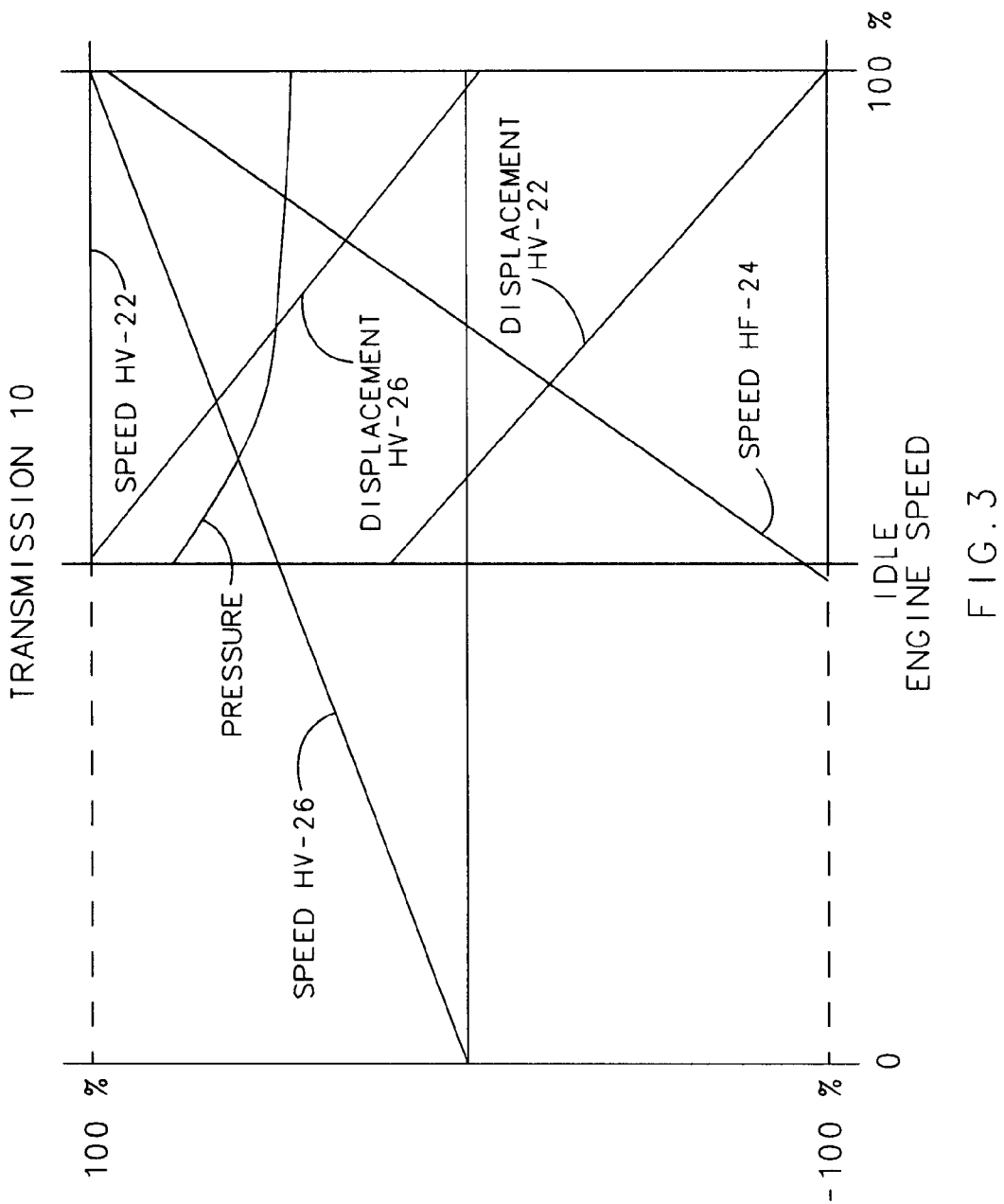
FIG. 3 is a graphic illustration of one operational scenario for the transmission of FIG. 1.

FIG. 3 illustrates an example of the various operational parameters of the components of the transmission 10 under one possible operating configuration, with speeds and displacements being expressed in terms of percentages of maximum normal operating speeds and displacements. In this example, it can be seen from FIG. 3 that the operation of the mechanical summer 20 and the hydraulic units 22 and 24 are essentially as known for an input summed constant speed drive transmission. It can also be seen that the speed of the hydraulic unit 26 increases from zero percent to 100 percent in proportion to the engine speed, while the displacement of the hydraulic unit 26 will typically transition from maximum displacement at or near the idle speed of the engine to zero displacement at or near 100 percent engine speed. However, it should be understood that the displacements of the hydraulic units 22 and 26 can also be a function of other operating parameters, such as torque load fluctuations in the dynamoelectric machine 14. It should also be understood that the displacement of the hydraulic unit 26 can be controlled in a step fashion, rather than in a proportion fashion. For example, the displacement of the hydraulic unit 26 could be set at maximum displacement from engine speeds at or near idle to engine speeds that approach straight through, where the displacement of the hydraulic unit 26 would then be reduced to or near zero displacement. However, proportional control of both of the variable hydraulic units 22 and 26 is preferred and can be used to optimize mid-speed range hydraulic unit working pressure. FIG. 3 also illustrates another desirable feature of transmission 10. At "straight through" input speed, i.e., where the trim speed or speed of the fixed hydraulic unit 24 is zero, in both conventional output summed or input summed units the controlling variable hydraulic unit also must go to zero displacement. These two occurrences together can cause an output control stability problem at "straight through" speed due to hydraulic unit friction and inertia, erratic leakage and low hydraulic pumping displacement. With the features of transmission 10, however, zero speed of the fixed hydraulic unit 24 need not be coincident with zero hydraulic unit pump displacement because the displacement of each of the variable hydraulic units 22 and 26 can be nearly equal and can be quite large at the straight through speed, thus reducing the instability forcing functions at straight through.

Figure 4:
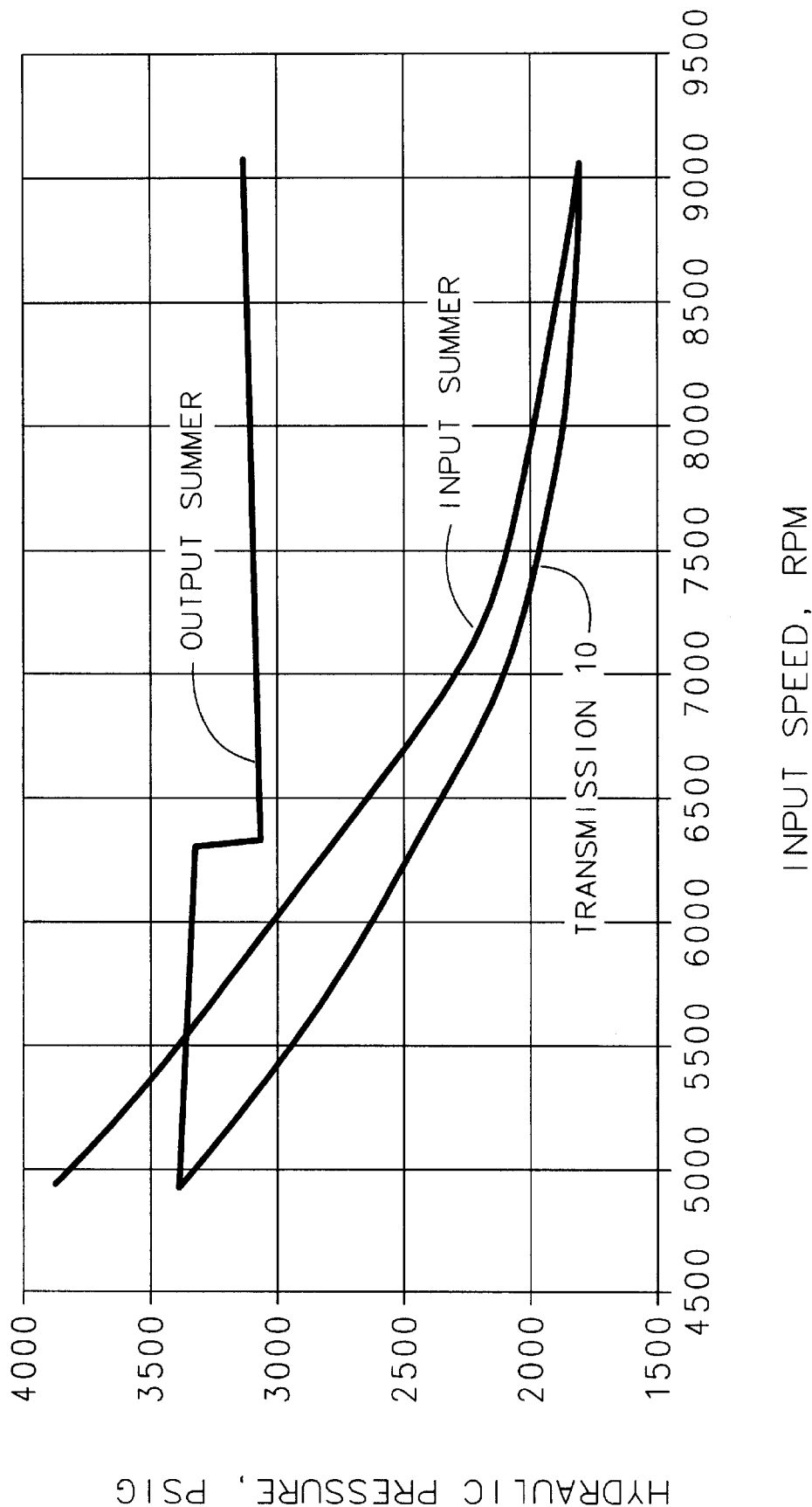
FIG. 4 is a graphically comparison of the operating pressures of the transmission in comparison to conventional input and output summed transmissions.
Figure 5:
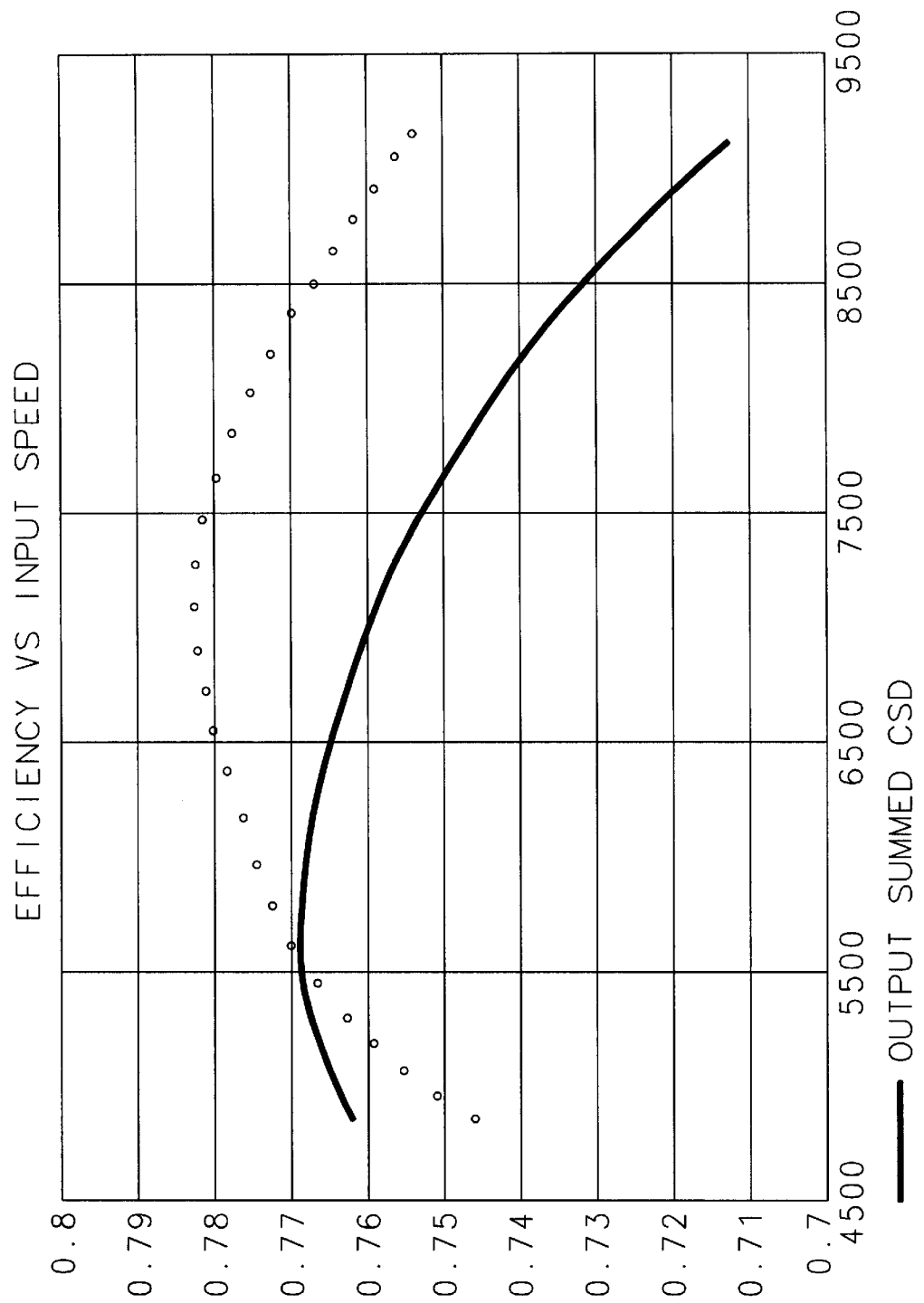
FIG. 5 is a graphical illustration of the efficiency versus input speed of the transmission in comparison to a conventional output summed transmission.
Figure 6:
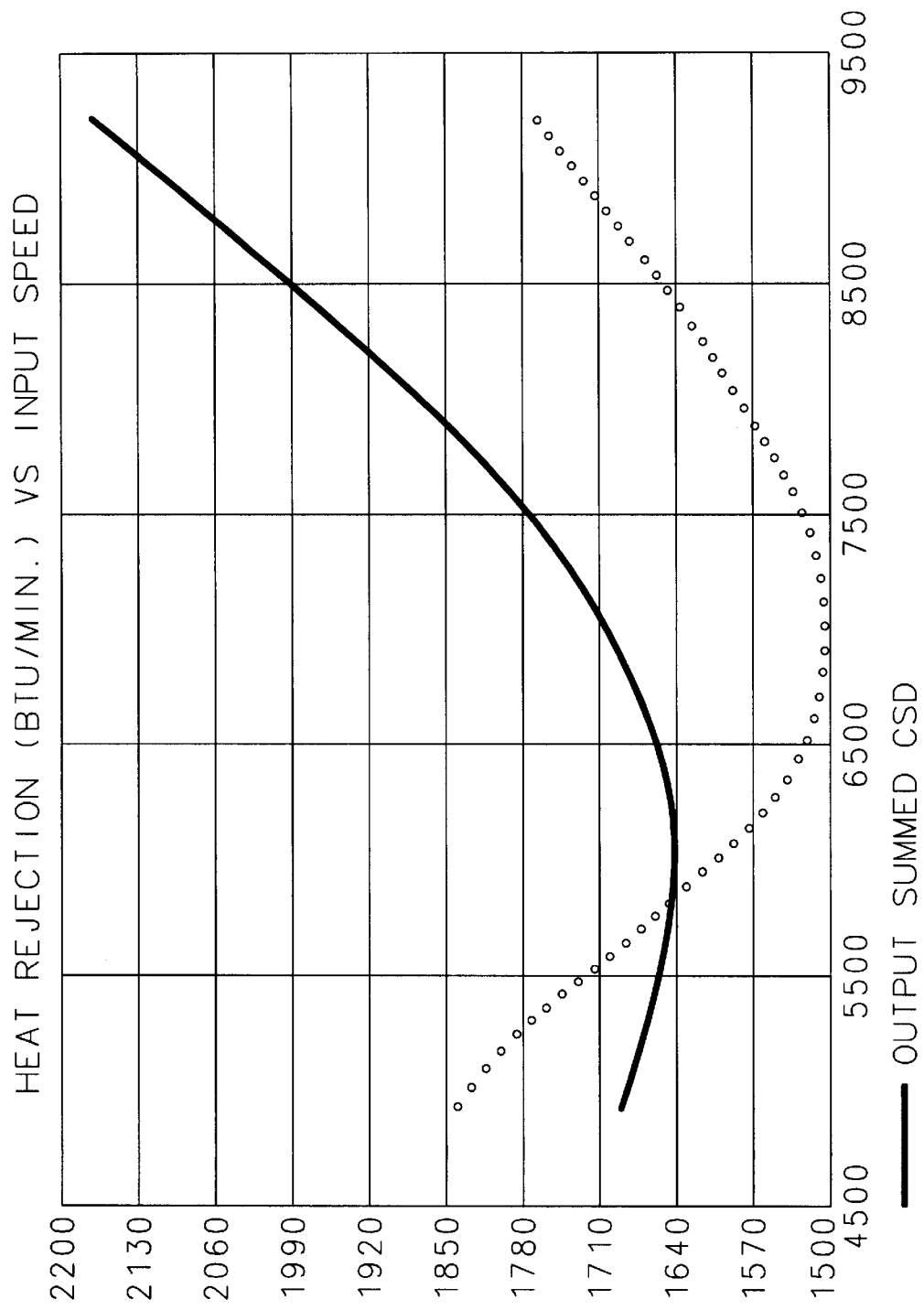
FIG. 6 is a graphical illustration of the heat rejection versus input speed of the transmission in comparison to a conventional output summed transmission.

By utilizing the hydraulic unit 26 to compensate for the inefficiencies of the input summed hydraulic units 22 and 24, the transmission 10 overcomes the deficiencies associated with the low speed torque capabilities, which can lead to recirculating hydraulic power problems in conventional input summed constant speed drives, while providing the benefits of the lower working pressure at higher input speeds provided by input summed constant speed drives in comparison to output summed constant speed drives. This is illustrated in FIG. 4, which shows one example of the hydraulic working pressure versus input speed of the transmission 10 in comparison to equivalent input and output summed transmissions. The lower working pressure of the transmission 10 in comparison to conventional output summed constant speed drives offers significant benefits in efficiency, heat rejection, and a reliability at higher input speed operating conditions, which is particularly desirable at the higher cruise speed operating conditions of aircraft engines. This is shown in FIGS. 5 and 6 which illustrate one example of efficiency and heat rejection versus input speed, respectively, for the transmission 10 in comparison to a conventional output summed transmission.

While each of the hydraulic units 22, 24 and 26 has been described as being a single hydraulic unit, it should be understood that in some applications it may be desirable for the function of one or more of the hydraulic units 22, 24 and 26 to be performed by two or more hydraulic units connected in parallel in a fashion similar to many known output summed constant speed drives.

Due to the flexibility inherent in the design of the transmission 10, other examples could be shown that would provide for higher low input speed efficiency depending on specific application requirements. Because of the inherent flexibility provided by utilizing the hydraulic unit 26, the transmission 10 can be configured to provide advantages associated with input summed units and with output summed units.

It is believed that the use of the hydraulic unit 26 can also add stability to any recirculating hydraulic power that may occur below the straight through condition of the transmission 10 because the hydraulic unit 26 can provide additional hydraulic power capability without producing a cascading effect between leakage and recirculating trim hydraulic power.

While a number of advantages have been expressly identified above, it should be understood that a transmission embodying the present invention may not necessarily provide all the identified advantages.

What is claimed is:

1. A transmission for use between a variable speed engine and a dynamoelectric machine to transmit drive torque to the dynamoelectric machine at a nominally constant speed from the variable speed engine, the transmission comprising:

an input shaft to transmit drive torque from an engine to a remainder of the transmission;

an output shaft to transmit drive torque to a dynamoelectric machine from the transmission;

a differential including an input rotary element driven by said input shaft, an output rotary element driving said output shaft, and a third rotary element rotatably coupled to the input and output rotary element to control the speed ratio between the input and output rotary elements;

a first variable displacement hydraulic unit rotatably coupled to the output rotary element to transmit torque between the first hydraulic unit and the output rotary element;

a second hydraulic unit rotatably coupled to the third rotary element to transmit torque between the second hydraulic unit and the third rotary element, the first and second hydraulic units hydraulically connected in parallel to vary the rotational speed of the second hydraulic unit as a function of the displacement of the first hydraulic unit; and a third hydraulic unit driven by the input shaft and hydraulically connected in parallel to the first and second hydraulic units to transfer hydraulic power thereto, wherein the third hydraulic unit is a variable displacement hydraulic unit to vary a rotational speed of the second hydraulic unit as a function of the displacement of the first and third hydraulic units.

2. The transmission of claim 1 wherein the second hydraulic unit is a fixed displacement hydraulic unit.

3. The transmission of claim 1 wherein the differential is a gear differential and each of the input, output and third rotary elements comprises at least one of a gear and a carrier.

4. The transmission of claim 1 wherein the first hydraulic unit is rotatably coupled to the output rotary element by a first gear train, the second hydraulic unit is rotatably coupled to the third rotary element by a second gear train, and the third hydraulic unit is rotatably coupled to the input shaft by a third gear train.

5. A transmission for use between variable speed engine and a dynamoelectric machine to transmit drive torque from the engine to the dynamoelectric machine at a nominally constant speed from the variable speed engine, the transmission comprising:

a input shaft to transmit drive torque from an engine to a remainder of the transmission;

an output shaft to transmit drive torque to a dynamoelectric machine from the transmission;

a differential including an input rotary element driven by said input shaft, an output rotary element driving said output shaft, and a third rotary element rotatably coupled to the input and output rotary elements to control the speed ratio between the input and output rotary elements, each of the input, output, and third rotary elements comprising at least one of a gear and a carrier;

a first variable displacement hydraulic unit rotatably coupled to the output rotary element to transmit torque between the first hydraulic unit and the output rotary element;

a second fixed displacement hydraulic unit rotatably coupled to the third rotary element to transmit torque between the second hydraulic unit, the third rotary element the first and second hydraulic units hydraulically connected in parallel to vary the rotational speed of the second hydraulic unit as a function of the displacement of the first hydraulic unit; and a third variable displacement hydraulic unit driven by the input shaft and hydraulicly connected in parallel to the first and second hydraulic units to transfer hydraulic power thereto.

6. A method of transmitting drive torque from a variable speed engine to a dynamoelectric machine at a nominally constant speed from a variable speed engine, the method comprising:

transmitting a first drive torque from a variable speed engine to an input rotary member of a differential;

transmitting a second drive torque between a first hydraulic unit and an output rotary member of the differential;

transmitting hydraulic power between the first hydraulic unit and a second hydraulic unit;

varying the displacement of the first hydraulic unit to vary the rotational speed of the second hydraulic unit and to obtain a nominally constant rotational speed of the output rotary member;

transmitting a third drive torque between the second hydraulic unit and a third rotary member of the differential to control the speed ratio between the input and output rotary members;

transmitting a fourth drive torque to a dynamoelectric machine from the output rotary member;

transmitting a fifth drive torque from the engine to a third hydraulic unit;

varying the displacement of the third hydraulic unit as a function of the speed of the engine; and transmitting hydraulic power from the third hydraulic unit to the first and second hydraulic units.

* * * * *